US011599121B2

United States Patent
Mielenz et al.

(10) Patent No.: US 11,599,121 B2
(45) Date of Patent: Mar. 7, 2023

(54) METHOD FOR LOCALIZING A MORE HIGHLY AUTOMATED VEHICLE (HAF), IN PARTICULAR A HIGHLY AUTOMATED VEHICLE, AND A VEHICLE SYSTEM

(71) Applicant: Robert Bosch GmbH, Stuttgart (DE)

(72) Inventors: Holger Mielenz, Ostfildern (DE); Jan Rohde, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 483 days.

(21) Appl. No.: 16/647,212

(22) PCT Filed: Sep. 7, 2018

(86) PCT No.: PCT/EP2018/074223
§ 371 (c)(1),
(2) Date: Mar. 13, 2020

(87) PCT Pub. No.: WO2019/063266
PCT Pub. Date: Apr. 4, 2019

(65) Prior Publication Data
US 2020/0233432 A1  Jul. 23, 2020

(30) Foreign Application Priority Data
Sep. 27, 2017  (DE) .......................... 102017217212.6

(51) Int. Cl.
*G05D 1/02* (2020.01)
*G01C 21/28* (2006.01)

(52) U.S. Cl.
CPC ........... *G05D 1/0274* (2013.01); *G01C 21/28* (2013.01); *G05D 2201/0213* (2013.01)

(58) Field of Classification Search
CPC ......... G05D 1/0274; G05D 2201/0213; G05D 1/0278; G01C 21/28; G01C 21/3602; G06V 20/56; G01S 5/16; G01S 5/0252
See application file for complete search history.

(56) References Cited

U.S. PATENT DOCUMENTS 9,823,661 B2 * 11/2017 Pink .................. G01S 13/931
2009/0228204 A1    9/2009 Zavoli et al.
(Continued)

FOREIGN PATENT DOCUMENTS

DE   102011112404 A1   3/2013
DE   102013011969 A1   1/2015
(Continued)

OTHER PUBLICATIONS

International Search Report for PCT/EP2018/074223, dated Dec. 17, 2018.

*Primary Examiner* — Donald J Wallace
(74) *Attorney, Agent, or Firm* — Norton Rose Fulbright US LLP; Gerard Messina

(57) ABSTRACT

A method for localizing a more highly automated vehicle (HAF), in particular a highly automated vehicle, in a digital map. The method includes: ascertaining a global pose estimation for the HAF using a localization module of a vehicle system of the HAF, the global pose estimation comprising a position and orientation of the HAF; transmitting at least one landmark position and at least one associated landmark property to the vehicle system; ascertaining a relative position of the landmark position concerning the HAF at least partially on the basis of the pose estimation and the landmark position; performing at least one sensor measurement and checking that the at least one landmark property is detectable at the relative position; and outputting an error (Continued)

indicator as the result of the checking. A corresponding system and a computer program are also described.

11 Claims, 2 Drawing Sheets

(56) References Cited

U.S. PATENT DOCUMENTS

| | | | |
|---|---|---|---|
| 2015/0281655 A1* | 10/2015 | Turetken | G06V 20/52 348/159 |
| 2016/0305794 A1* | 10/2016 | Horita | G06V 20/582 |
| 2017/0344844 A1* | 11/2017 | Sano | G06V 20/10 |

FOREIGN PATENT DOCUMENTS

| | | |
|---|---|---|
| DE | 102015211279 A1 | 12/2015 |
| DE | 102016203723 A1 | 9/2017 |
| EP | 3078937 A1 | 10/2016 |
| WO | 2016130719 A2 | 8/2016 |

\* cited by examiner

METHOD FOR LOCALIZING A MORE HIGHLY AUTOMATED VEHICLE (HAF), IN PARTICULAR A HIGHLY AUTOMATED VEHICLE, AND A VEHICLE SYSTEM

FIELD

The present invention relates to a method for localizing a more highly automated vehicle (HAF), in particular a highly automated vehicle, in a digital map and to a vehicle system for controlling a more highly automated vehicle (HAF), in particular a highly automated vehicle.

BACKGROUND INFORMATION

In view of an increase of the degree of automation of vehicles, more and more complex vehicle systems are used. Such vehicle systems and functions, such as, e.g., highly automated driving or fully automated driving, require a great number of sensors in the vehicle, which allow for an exact detection of the vehicle surroundings.

More highly automated is understood below as all those degrees of automation that correspond, in the sense of the Bundesanstalt für Straßenwesen (BASt) (Federal Highway Research Institute), to an automated longitudinal and lateral guidance with increasing system responsibility, e.g., highly and fully automated driving.

The related art describes a multitude of possibilities of implementing a method for localizing a more highly automated vehicle (HAF), in particular a highly automated vehicle. Thus, for example, current vehicle systems (i.e., Advanced Driver Assistance Systems (ADAS)) and highly automated vehicle systems (UAD, urban automated driving) increasingly presuppose detailed knowledge about the surroundings of the vehicle and awareness of situations. As the basis for the perception of the surroundings, sensor measurement data are used, from which various objects such as, e.g., roadway markings, masts and traffic signs may be extracted with the aid of so-called detector algorithms. On the basis of these objects, it is then possible to model a surroundings of the vehicle, which makes it possible for example to plan a trajectory for an ego vehicle or to take other decisions of action. Apart from the on-board sensor system, information from maps is increasingly used as additional source, it being possible for the maps to be transmitted from a central map or back end server to the respective vehicle. Subsequently, the received surroundings information from the maps are matched in the vehicle system with the detected surroundings information. This allows for a global vehicle localization. In order to be able to make use of required information from the map, a minimum localization accuracy must be exceeded.

Thus, conventional localization methods, for example, are based on a combination of global navigation satellite systems (GNSS), such as for example GPS, GLONASS or Galileo, and driving dynamics sensors, such as for example rate-of-rotation sensors, acceleration sensors, steering wheel angle sensors or wheel speed sensors. As is conventional, a decisive factor for the accuracy of a GNSS-based vehicle localization is the quality of the GNSS resolution, which however is subject to fluctuations in location and over time. This accuracy can be improved by corrective services.

SUMMARY

It is an objective of the present invention to provide an improved method for operating a more highly automated vehicle (HAF), in particular a highly automated vehicle, and an improved vehicle system for controlling a more highly automated vehicle (HAF), in particular a highly automated vehicle, by which the disadvantages mentioned above are at least improved upon.

The objective may be achieved in accordance with example embodiments of the present invention. Advantageous developments of the present invention are described herein.

According to one aspect of the present invention, an example method is provided for localizing a more highly automated vehicle (HAF), in particular a highly automated vehicle, in a digital map, comprising the following steps:

S1 ascertaining a global pose estimation for the HAF using a localization module of a vehicle system of the HAF, the global pose estimation comprising a position and orientation of the HAF;

S2 transmitting at least one landmark position and at least one associated landmark property to the vehicle system;

S3 ascertaining a relative position of the landmark position concerning the HAF at least partially on the basis of the pose estimation and the landmark position;

S4 performing at least one sensor measurement and checking that the at least one landmark property is detectable at the relative position; and S5 outputting an error indicator as the result of the check performed in step S4.

In a preferred specific embodiment, the method according to the present invention further includes the performance of at least one of the following steps S6, S7 and/or S8 as a function of the value of the error indicator.

In step S6, a confirmation is performed of the pose estimation performed in step S1 in the event that the error indicator indicates that the at least one landmark property was detected at the relative position. In step S7, the pose estimation performed in step S1 is discarded in the event that the error indicator indicates that the at least one landmark property is not detectable at the relative position. In step S8, the landmark position transmitted in step S2 is disregarded in the event that the error indicator indicates that no observations are possible at the relative position.

The example method according to the present invention preferably includes the following additional steps S9 and S10, step S9 comprising a new performance of steps S3 through S5 for a defined number of further landmarks transmitted in S2 and step S10 comprising a reset of the localization module in the event that step S7 for all landmarks examined in step S9 results in the pose estimation performed in step S1 being discarded, as well as a performance of a re-localization; the re-localization preferably occurring by way of a particle-based approach.

Here it is advantageous if the pose estimation performed in step S1 is performed on the basis of a map-matching algorithm.

Fundamentally, it is possible for the pose estimation performed in step S1 to be performed on the basis of a dense occupancy grid transmitted from a back end server.

Advantageously, the pose estimation performed in step S1 occurs at least partially by sensor measurements.

It is possible in this regard that the pose estimation performed in step S1 is performed at least partially on the basis of a satellite-based localization method, in particular GPS.

For the further proceeding, one specific embodiment of the present invention advantageously provides for the pose estimation performed in step S1 to occur at least partially on the basis of a transformation between current sensor observations and a map section stored in a digital map.

In this regard, it has proved advantageous that in step S2 a plurality of landmark positions and associated landmark properties are transmitted, and that steps S3 through S8 are performed for each of the transmitted landmark positions and associated landmark properties.

The present invention also provides an example vehicle system for controlling a more highly automated vehicle (HAF), in particular a highly automated vehicle, the vehicle system comprising at least one localization module, at least one sensor for detecting landmark properties in the surroundings of the HAF, and a control device, the control device being designed to carry out a method in accordance with the present invention.

Furthermore, a computer program, comprising program code for implementing the example method, when the computer program is executed on a computer, is also provided in accordance with the present invention.

Although the present invention is described below chiefly in connection with passenger cars, it is not limited to these, but may be used with any kind of vehicle, cargo trucks and/or passenger cars.

Additional features, possible applications and advantages of the present invention result from the following description of exemplary embodiments of the present invention, which are shown in the figures. It should be noted that the represented features only have a descriptive character and may also be used in combination with features of other developments described above and are not intended to limit the present invention in any form whatsoever.

BRIEF DESCRIPTION OF THE DRAWINGS

The present invention is explained below in more detail with reference to a preferred exemplary embodiment, the same reference symbols being used for identical features.

DETAILED DESCRIPTION OF EXAMPLE EMBODIMENTS

Figure 1:
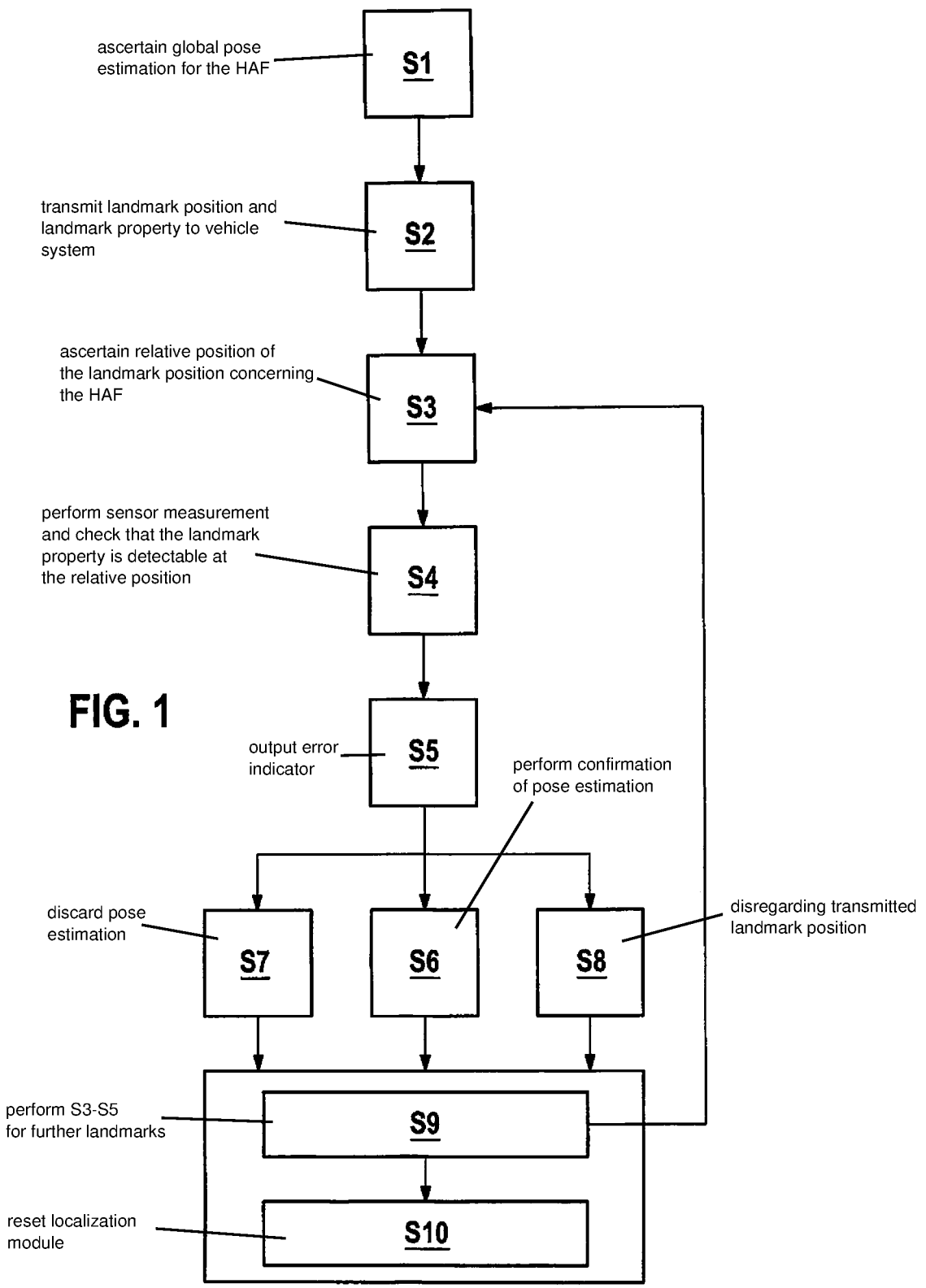
FIG. 1 shows a flow chart of a first specific embodiment of the method according to the present invention.

In step S1 of FIG. 1, a global pose estimation for a more highly automated vehicle (HAF) is performed by a localization module of a HAF, a pose estimation being understood here as the sum of the information of a position and an orientation of the HAF. In this instance, this localization may be performed by the localization module of a vehicle system on the basis of a dense occupancy grid transmitted from a back end server as well as on the basis of sensor measurements. This preferably occurs by using map-matching algorithms, which estimate the transformation between the current sensor observations and the current map section stored in a digital map.

The pose estimation may be performed at least partially on the basis of a satellite-based localization method, in particular GPS.

In the occupancy grid, the surroundings of the HAF are subdivided into cells, a classification as "drivable" (able to be driven on) and "occupied" being stored for each cell, for example. Apart from the drivability, a classification on the basis of other characteristics may also be stored, for example a reflected radar energy. Apart from good compressibility, an advantage of the occupancy grid is the high degree of abstraction, which also allows for a fusion of different kinds of sensors, such as for example stereo camera, radar, LiDAR or ultrasonic sensors.

In a step S2, at least one, preferably multiple landmark positions 200 and at least one, preferably multiple associated landmark properties are transmitted to the automated vehicle system. This transmission occurs in addition to the transmission of the occupancy grid.

In a step S3, relative positions of the landmark positions 200 with respect to the HAF are ascertained at least partially on the basis of the pose estimation and the landmark positions 200.

In a step S4, at least one sensor measurement 100, preferably multiple sensor measurements 101, 102, 103 are performed and a check is performed as to whether the landmark properties are detectable at the relative position. For a correct map-matching result, the landmark positions 200 are known in the current sensor measurements.

In a step S5, an error indicator is output as the result of the check performed in step S4.

In this regard, there are several possibilities for checking the validity of the matching result:

Possibility 1: Confirmation of the pose estimation performed in step S1 in the event that the error indicator indicates that the at least one landmark property was detected at the relative position. This is represented in FIG. 1 by step S6 and it means that corresponding sensor measurements 100, for example LiDAR measurements, exist in the area of the presumed landmark positions 200.

If the specified landmark type is detected in these sensor measurements 100 with sufficiently high probability, then the entire matching result is also recognized as valid.

Figure 2:
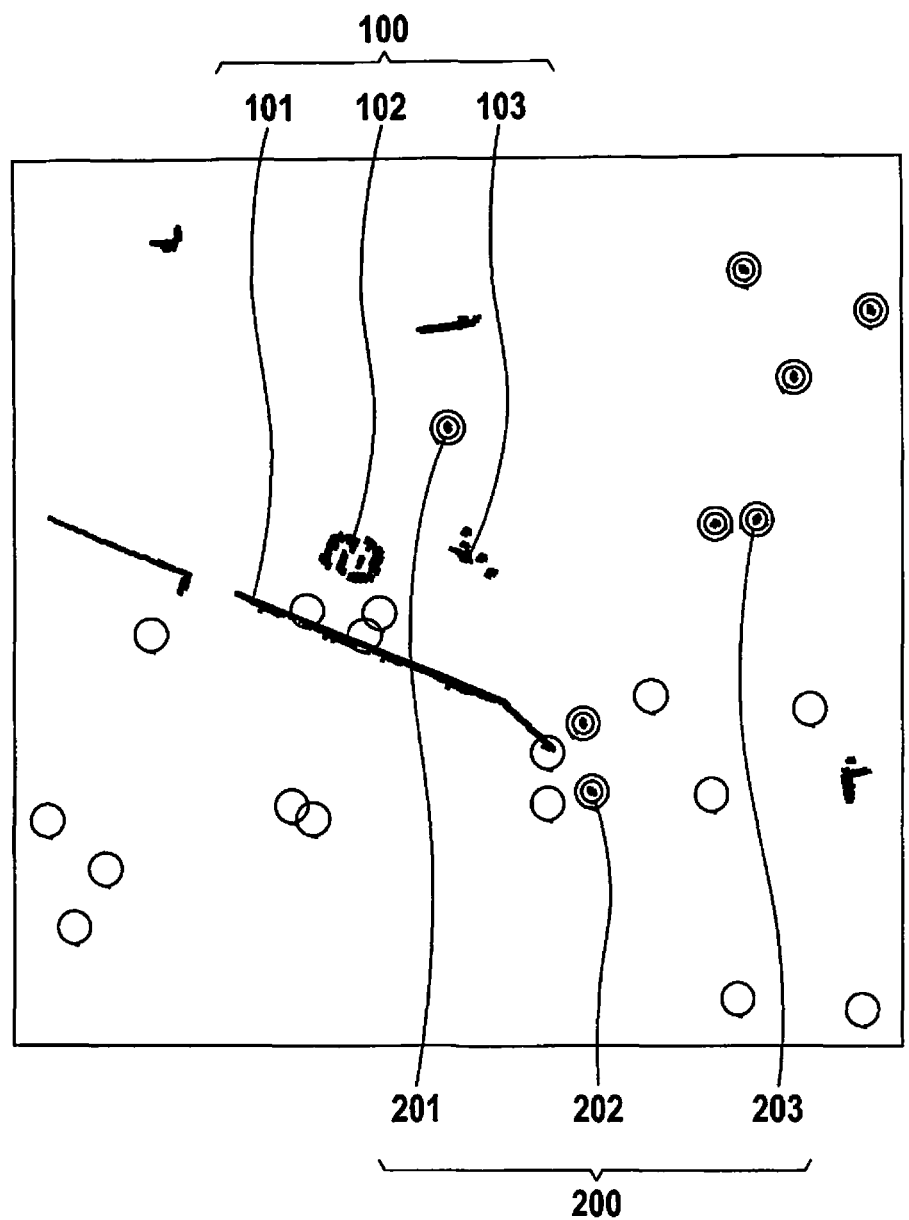
FIG. 2 shows a surroundings of a vehicle represented in the form of sensor measurements and landmarks.

Such a case is illustrated in FIG. 2 by way of example. The matching result was ascertained on the basis of the illustrated sensor measurements 100, 101, 102, 103. For example, landmark positions 201, 202, 203, which were found in the LiDAR scan, are surrounded by double circles.

Possibility 2: Discarding the pose estimation performed in step S1 in the event that the error indicator indicates that the at least one landmark property is not detectable at the relative position. This is represented in FIG. 1 by step S7 and it means that no sensor measurements 100 exist in the area of the presumed landmark positions 200. This is judged to be a clear indication of an invalid matching result.

Possibility 3: Disregarding the landmark position 201, 202, 203 transmitted in step S2 in the event that the error indicator indicates that no observations are possible at the relative position. This is represented in FIG. 1 by step S8. Such a case occurs for example if the surroundings of the vehicle are substantially concealed in the area of the presumed landmark positions 200, for example by parked vehicles or temporary obstructions. No assertion is possible in this case.

Depending on the number of transmitted landmark positions 200, 201, 202, 203, steps S3 through S5 are performed sequentially for the defined number of the landmark positions 200, 201, 202, 203 transmitted in step S2, which is indicated in FIG. 1 by step S9.

In a step denoted by S10 in FIG. 1, a reset of the localization module is performed in the event that step S7 for all of the landmarks examined in step S9 has the result that the pose estimation performed in step S1 is discarded. In this case, a re-localization of the localization module is performed, the re-localization preferably being performed using a particle-based approach. Algorithms based on such an approach are conventional.

A vehicle system for controlling a HAF, in particular a highly automated vehicle, in accordance with the present invention must accordingly comprise:
- at least one localization module;
- at least one sensor for detecting landmark properties in a surroundings of the HAF;
- a control device, the control device being designed for implementing a method as recited in one of claims 1 through 9.

The present invention is not limited to the exemplary embodiment shown. Rather, it also comprises all developments by those skilled in the art.

Besides the specific embodiments described and illustrated, additional specific embodiments are possible, which may include further variations as well as combinations of features.

What is claimed is:

1. A method for localizing a highly automated vehicle (HAF) in a digital map, the method comprising:
   S1) ascertaining a global pose estimation for the HAF by performing a localization, in which the global pose estimation includes a position of the HAF and an orientation of the HAF;
   S2) transmitting at least one landmark position and at least one associated landmark property to the vehicle system;
   S3) ascertaining a relative position of the landmark position concerning the HAF at least partially based on the pose estimation and the landmark position;
   S4) performing at least one sensor measurement and checking that the at least one landmark property is detectable at the relative position; and
   S5) outputting an error indicator as the result of the check performed in step S4;
   wherein the pose estimation performed in step S1 is performed using a dense occupancy grid transmitted from a back end server, and
   wherein in the occupancy grid, the surroundings of the HAF are subdivided into cells, and a classification as "drivable" or "occupied" is stored for each cell, and at least another classification based on at least another characteristic is also stored, including a reflected radar energy.

2. The method as recited in claim 1, wherein, as a function of the value of the error indicator, performing at least one of the following:
   S6) confirming the pose estimation performed in step S1 in the event that the error indicator indicates that the at least one landmark property was detected at the relative position; and/or
   S7) discarding the pose estimation performed in step S1 in the event that the error indicator indicates that the at least one landmark property is not detectable at the relative position; and/or
   S8) disregarding the landmark position transmitted in step S2 in the event that the error indicator indicates that no observations are possible at the relative position.

3. The method as recited in claim 2, further comprising:
   S9) performing anew the steps S3 through S5 for a defined number of further landmarks transmitted in step S2; and
   S10) resetting the localization in the event that the step S7 for all of the landmarks examined in step S9 results in the discarding of the pose estimation performed in step S1, and performing a re-localization.

4. The method as recited in claim 3, wherein the re-localization is performed using a particle-based approach.

5. The method as recited in claim 2, wherein in step S2, a plurality of landmark positions and associated landmark properties are transmitted, and steps S3 through S8 are performed for each of the transmitted landmark positions and associated landmark properties.

6. The method as recited in claim 1, wherein the pose estimation performed in step S1 is also performed using a map-matching algorithm.

7. The method as recited in claim 1, wherein the pose estimation performed in step S1 also occurs at least partially by sensor measurements.

8. The method as recited in claim 1, wherein the pose estimation performed in step S1 is also performed at least partially using a satellite-based localization method including GPS.

9. The method as recited in claim 1, wherein the pose estimation performed in step S1 also occurs at least partially based on a transformation between current sensor observations and a map section stored in a digital map.

10. A vehicle system for controlling a highly automated vehicle (HAF), comprising:
    at least one sensor configured to detect landmark properties in a surroundings of the HAF;
    a control device to localize the HAF in a digital map, by performing the following:
    S1) ascertaining a global pose estimation for the HAF by performing a localization, in which the global pose estimation includes a position of the HAF and an orientation of the HAF;
    S2) transmitting at least one landmark position and at least one associated landmark property to the vehicle system;
    S3) ascertaining a relative position of the landmark position concerning the HAF at least partially based on the pose estimation and the landmark position;
    S4) performing at least one sensor measurement and check that the at least one landmark property is detectable at the relative position; and
    S5) outputting an error indicator as the result of the check in S4;
    wherein the pose estimation performed in step S1 is performed using a dense occupancy grid transmitted from a back end server, and
    wherein in the occupancy grid, the surroundings of the HAF are subdivided into cells, and a classification as "drivable" or "occupied" is stored for each cell, and at least another classification based on at least another characteristic is also stored, including a reflected radar energy.

11. A non-transitory computer-readable medium, on which is stored a computer program, which is executable by a processor, comprising:
    a program code arrangement having program code for localizing a highly automated vehicle (HAF) in a digital map, by performing the following:
    S1) ascertaining a global pose estimation for the HAF by performing a localization, in which the global pose estimation includes a position of the HAF and an orientation of the HAF;
    S2) transmitting at least one landmark position and at least one associated landmark property to the vehicle system;
    S3) ascertaining a relative position of the landmark position concerning the HAF at least partially based on the pose estimation and the landmark position;

S4) performing at least one sensor measurement and checking that the at least one landmark property is detectable at the relative position; and S5) outputting an error indicator as the result of the check performed in step S4;

wherein the pose estimation performed in step S1 is performed using a dense occupancy grid transmitted from a back end server, and wherein in the occupancy grid, the surroundings of the HAF are subdivided into cells, and a classification as "drivable" or "occupied" is stored for each cell, and at least another classification based on at least another characteristic is also stored, including a reflected radar energy.

* * * * *